United States Patent [19]
Schwerin

[11] 3,905,383
[45] Sept. 16, 1975

[54] HYDRAULIC CONTROL DEVICE

[75] Inventor: Günther Schwerin, Moglingen, Germany

[73] Assignee: Robert Bosch G.m.b.H., Stuttgart, Germany

[22] Filed: Oct. 24, 1974

[21] Appl. No.: 517,809

[30] Foreign Application Priority Data
Nov. 30, 1973 Germany............................ 2359755

[52] U.S. Cl............................... 137/110; 137/492.5
[51] Int. Cl.². ......................................... G05D 16/10
[58] Field of Search................. 137/110, 492.5, 506

[56] References Cited
UNITED STATES PATENTS
2,664,102  12/1953  Coberly ........................ 137/492.5 X
3,329,153  7/1967  Biabaud....................... 137/492.5 X Primary Examiner—Robert G. Nilson
Attorney, Agent, or Firm—Michael S. Striker

[57] ABSTRACT

A housing of the device has a first port for connection to a source of pressure fluid, a second port for connection to a reservoir, and internal passages which connect these ports. A pressure limiting valve is interposed in the passages for limiting the pressure that can prevail in the first port. A spring-loaded relief valve is also interposed in the passage intermediate the second port and the pressure limiting valve with which it is connected in series, and a switching valve is interposed in the passages connected in parallel with the pressure limiting valve and located intermediate the first port and the relief valve. The switching valve is thus controlled by the pressure which prevails ahead of the relief valve and the control device establishes communication between the ports in dependence upon the pressure which prevails in the first port.

11 Claims, 1 Drawing Figure

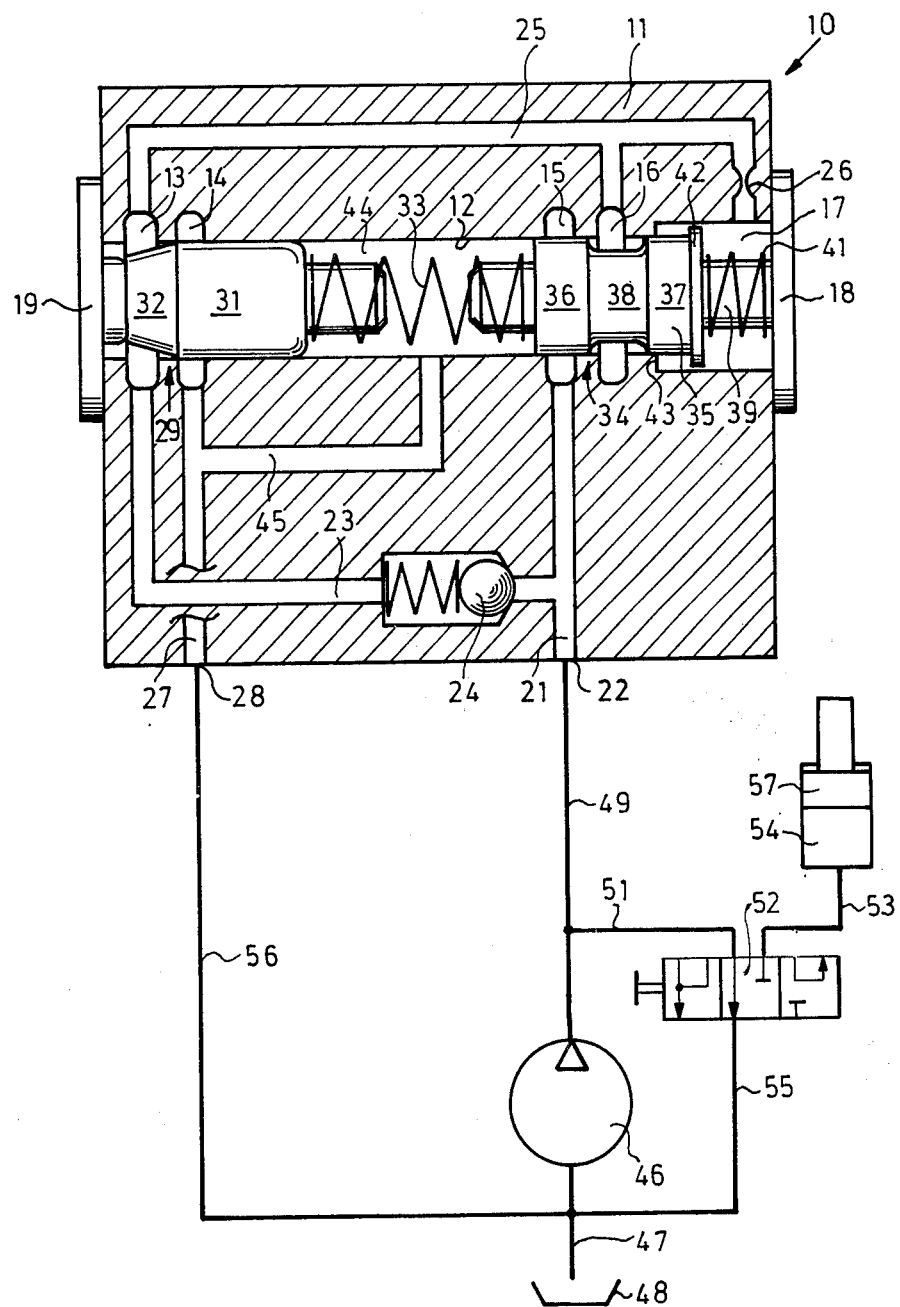

HYDRAULIC CONTROL DEVICE

BACKGROUND OF THE INVENTION

The present invention relates to a hydraulic control device in general, and more particularly to a hydraulic control device having a port in which is to be connected with a source of pressure fluid, a port which is to be connected with a fluid reservoir, and an arrangement which controls the communication between the ports.

A control device of this general type is known from the prior art and utilizes a pressure limiting valve and an additional arrangement which serves, in dependence upon the pressure prevailing at the port that is to be connected with the source of pressure fluid, to control the communication between the ports, that is to establish it or interrupt it. In this prior-art device this additional arrangement is a valve spool which is connected in parallel with the pressure limiting valve, and a pilot valve is arranged in this valve spool which provides a control that triggers the movement of the valve spool. In order for the latter to move at all, the pilot valve must be preset to react at a pressure level which is lower by a certain amount than the pressure level at which the pressure limiting valve operates. If such a device is used in a hydraulic circuit having a fixed maximum pump pressure, the difference between the pressure level at which the pilot valve operates and the pressure level at which the pressure relief valve operates, creates a pressure region which is lost to all useful applications, that is no pressure requiring a level within this region is available for any application. This can frequently be disadvantageous. In addition to this drawback, the prior-art device is difficult to adjust and is relatively complicated and expensive to construct, because it requires a hollow valve spool and internal pilot valve and transverse bores.

SUMMARY OF THE INVENTION

It is a general object of this invention to provide an improved hydraulic control device of the type in question which is not possessed of the aforementioned disadvantages.

More particularly, it is an object of the present invention to provide such an improved control device which is considerably simpler than what is known from the prior art, and is therefore less expensive to construct and more reliable in operation.

A further object of the invention is to provide such a novel control device which makes it possible to fully utilize the maximum pressure that is supplied by the source of pressure fluid.

In keeping with these objects, and with others which will become apparent hereafter, one feature of the invention resides in a hydraulic control device which, briefly stated, comprises a housing having a first port for connection to a source of pressure fluid, a second port for connection to a reservoir, and passage means connecting these ports. A pressure limiting valve is interposed in the passage means for limiting the pressure in the first port. Means is provided for controlling the communication between the ports in dependence upon the pressure in the first port; this means comprises a spring-loaded relief valve in the passage means intermediate the second port and the pressure limiting valve and connected in series with the pressure limiting valve. The means further comprises a switching valve in the passage means connected in parallel to the pressure limiting valve intermediate the first port and the relief valve and being controlled by the pressure which prevails ahead of the relief valve.

In this construction the pressures acting at the pressure limiting valve and the pressure relief valve will be added when the device operates, and this means that the maximum pump pressure or pressure supplied by the source of pressure fluid, can be fully utilized. The pressures of the pressure limiting valve and that of the pressure relief valve are independent of one another, so that there need be no fear that one of these valves might influence the other or that difficulties might be experienced in setting the pressure levels.

A particularly simple embodiment of the present invention, one that is highly advantageous, is obtained if the valve members of the pressure relief valve and of the switching valve are arranged in a common valve bore of the housing of the device, since this provides for a very uncomplicated construction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a longitudinal section through a device according to the present invention and includes a diagrammatic illustration of a hydraulic circuit with which the device can be used.

DESCRIPTION OF THE PREFERRED EMBODIMENTS

Referring to the drawing in detail it will be seen that reference numeral 10 identifies the hydraulic control device according to the present invention in toto. The device 10 has a housing 11 in which there is formed a valve bore 12 which extends from one to another end of the housing. The opposite ends of the valve bore are closed by respective covers 18 and 19 which are secured to the housing 11 in suitable manner well known to those skilled in the art and forming no part of the invention. The valve bore 12 is formed with a first switching chamber 13 and a laterally adjacent first outlet chamber 14. Spaced from these chambers in axial direction of the valve bore is an inlet chamber 15, a laterally adjacent second switching chamber 16, and laterally adjacent the latter a pressure chamber 17 which is closed by the aforementioned cover 18. The housing 11 is formed with two fluid ports of which the port 22 is to be connected with a source of pressure fluid, here illustrated as the pump 46, whereas the other port 28 is to be connected via the return flow line 56 with the reservoir 48 from which in the illustrated embodiment the pump 46 draws liquid through the section line 47 to expel it through the pressure line 49 into the port 22. A channel 21 connects the chamber 15 with the port 22, and a connecting channel 23 communicates the channel 21 with the first switching chamber 13. A pressure limiting valve 24 is interposed in the channel 23 so as to limit the pressure in the channel 21 and port 22. The switching chambers 13 and 16 are connected by a further connecting channel 25 with one another and also via a throttling gap 26 with the pressure chamber 17. The throttling gap 26 is in the illustrated embodiment located immediately upstream of the inlet to the pressure chamber 17. A return flow channel 27 extends from the outlet chamber 14 to the port 28.

The device 10 incorporates a pressure relief valve or dumping valve 29 having a substantially rod-shaped slidable valve member 31 which is slidably accommodated in the valve bore 12. The end portion of the member 31 which faces towards the cover 19 is provided with a throttling portion 32, and the opposite end portion is engaged by an expansion spring 33 which permanently tends to urge the valve member 31 into the illustrated starting position.

The device 10 further comprises a switching valve 34 having a valve member which is configured as a valve spool 35 that is also slidably accommodated in the valve bore 12. The valve spool 35 is formed with two lands 36 and 37 intermediate which there is formed an annular groove 38. The spring 33 abuts against the land 36 and permanently tends to urge the valve spool 35 into the illustrated starting position in which an extension 39 formed at the right-hand end of the valve spool 35 abuts the cover 18. This urging of the valve spool 35 to the illustrated starting position by the spring 33, which latter is located in a second outlet chamber 44 forming a part of the valve bore 12, is opposed by a further spring 41 which surrounds the extension 39 and bears upon the cover 18 and the valve spool 35, but is weaker than the spring 33. The second chamber 44 communicates via a channel 45 with the return flow channel 27.

In the starting position of the valve spool 35 which is illustrated in the drawing, the land 36 blocks the inlet chamber 15 while the land 37 separates the second switching chamber 16 from the pressure chamber 17. The housing 11 is formed with an internal shoulder 43 which can be engaged by a flange 42 formed on the land 37.

As mentioned before, the pump 46 draws fluid from the reservoir 48 via the suction line 47 and expels this fluid via the pressure line 49 into the port 22. The pressure line 49 also communicates via a branch line 51 with a control valve 52 whose construction is not shown in detail but which can be moved between a neutral position and a working position. The control valve 52 is connected via a conduit 53 with a user 54 having a piston 57 whose movement is controlled by the pressure fluid that can be channelled by the valve 52. Return flow lines 55, 56, connect the valve 52 and the port 28 with the reservoir 48.

In operation the pump 46 supplies pressure fluid via the lines 49 and 51 to the valve 52. When the valve 52 is in its neutral position, this pressure fluid flows back into the line 55 and from there into the reservoir 48. When the valve 52 is in its working position, the pressure fluid does not flow into the line 55 but instead flows into the line 53 and from there into the user 54. Assuming that under such circumstances the piston 57 of the user 54 moves against an abutment and that, as a result of the continuous pumping of the pump 46 the pressure in the line 49 continues to increase beyond the pressure limit set by the pressure limiting valve 24, the pressure limiting valve 24 of the device 10 will operate and permit pressure fluid to flow via the valve 24 and the channel 23 into the first switching chamber 13. From there, the pressure fluid flows via the channel 25 into the chamber 17. Because of the presence of the throttling gap 26, a pressure build-up will occur on the first switching chamber 13 to a level sufficient to shift the valve member 31 in rightward direction against the force of the spring 33. As the throttling portion 32 moves with the remainder of the valve member 31, it opens communication between the first switching chamber 13 and the first outlet chamber 14 so that pressure fluid can now flow back to into the reservoir 48 via the channel 27, the port 28 and the line 56. Because the valves 24 and 29 are connected in series with one another, the total pressure at which the pump 46 is relieved by pumping of fluid via the valve 24, is precisely predetermined and is the sum of the operating pressures of the valves 24 and 29. These operating pressures can be adjusted independently of one another. This arrangement thus means that the maximum pump pressure can be fully utilized.

As the return flow of fluid to the reservoir 48 begins in response to the operation of valve 29, a pressure also builds up via the throttling gap 26 in the pressure chamber 17. When this pressure reaches a level at which it is smaller than the pressure in the first switching chamber 13 only by the factor resulting from the presence of the spring 41, an equilibrium of forces acting upon the valve spool 35 will have been established. This permits the spring 41 to shift the valve spool 35 leftward from the illustrated position, and the speed of such shifting movement is determined by the throttling gap 26. As a result of this leftward movement, the groove 38 of the valve spool 35 establishes communication between the inlet chamber 15 and the second switching chamber 16, whereupon the pressure limiting valve 24 returns to its closed position and pressure fluid now flows from the first port 22 via the channel 29, the switching valve 34 (the chamber 15, the groove 38 and the chamber 16 thereof), the channel 25, the relief valve 29 (the chambers 13 and 14), and the second port 28 to the reservoir 48. The pressure at the pump 46 is exclusively determined by the presence of the spring 33 and its action.

The leftward movement of the valve spool 35 ends when the flange 42 engages the shoulder 43, in which position the valve spool 35 will be retained by the spring 41 since the forces of the springs 33 and 41 are now in equilibrium due to the fact that the spring 41 is aided by the pressure in the pressure chamber 17.

The just described condition of the device 10 continues until the valve 52 is switched from its operating position to its neutral position, permitting pressure fluid from the pump 46 to return directly via the line 55 into the reservoir 48. This assumes that the pressure resulting from the circulation of fluid via the valve 52 is smaller than the pressure corresponding to the difference of the pressure exerted by the spring 33 and the pressure exerted by the spring 41. If the pressure of fluid circulating via the valve 52 drops below this differential valve, then the force of the spring 33 overcomes the spring 41 and shifts the valve spool 35 rightwards to the illustrated starting position, in which its extension 39 engages the housing 18. The inlet chamber 15 is then cut off from the second switching chamber 16 and no further pressure fluid can enter into the first switching chamber 13, so that the spring 33 can now also shift the valve member 31 leftward back to its illustrated starting position, thus blocking the communication between the chambers 13 and 14. The leftward movement of the valve member 31 terminates when the throttling portion 32 thereof abuts the cover 19.

It will be appreciated that various modifications may be made without departing from the intent of the invention. For example, in place of the illustrated throttling gap 26 a one-way throttling valve could be utilized if it is desired that the movement of the valve spool 35 to its illustrated blocking position take place more rapidly than its movement from its blocking position.

It will be understood that each of the elements described above, or two or more together, may also find a useful application in other types of constructions differing from the types described above.

While the invention has been illustrated and described as embodied in a hydraulic control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control device, comprising a housing having a first port for connection to a source of pressure fluid, a second port for connection to a reservoir, and passage means connecting said ports; a pressure limiting valve interposed in said passage means for limiting the pressure in said first port; and means for controlling the communication between said ports in dependence upon the pressure in said first port, comprising a spring-loaded relief valve in said passage means intermediate said second port and said pressure limiting valve and in series with said pressure limiting valve, and a switching valve in said passage means parallel to said pressure limiting valve intermediate said first port and said relief valve and being controlled by the pressure which prevails ahead of said relief valve.

2. A device as defined in claim 1, wherein said relief valve and said switching valve have respective valve members which are jointly located within a portion of said passage means.

3. A device as defined in claim 2; and further comprising a spring located between and bearing upon said valve members and urging each thereof to a position in which the associated valve is closed.

4. A device as defined in claim 3, wherein said passage portion is formed with a first switching chamber and a longitudinally adjacent first outlet chamber, an inlet chamber spaced from said first outlet chamber longitudinally of said passage portion, a second switching chamber longitudinally adjacent said inlet chamber and communicating with said first switching chamber, and a pressure chamber.

5. A device as defined in claim 4, wherein said valve member of said relief valve is a rod-shaped slide member having a first end portion in the region of said first switching chamber and first outlet chamber and another portion remote therefrom, said first end portion being configured as a throttling portion; further comprising a second outlet chamber intermediate said first outlet chamber and said inlet chamber and accomodating said spring, said other end portion of said slide member in part delimiting said second outlet chamber.

6. A device as defined in claim 5, wherein said valve member of said switching valve is a slidable valve spool having a first land adjacent said second outlet chamber and blocking said inlet chamber when said valve spool is in said position, and a second land which in said position separates said switching chamber from said pressure chamber.

7. A device as defined in claim 6, wherein said pressure chamber is formed with a shoulder, and said valve spool has a flange adapted for abutment with said shoulder.

8. A device as defined in claim 6, wherein said passage means comprises passage portions connecting said pressure chamber with said first and second switching chambers; and further comprising throttling means interposed between said switching chambers and an inlet to said pressure chamber.

9. A device as defined in claim 8, said pressure chamber having an open end communicating with the exterior of said housing; and further comprising a cover closing said open end.

10. A device as defined in claim 9, wherein said valve spool has an end portion in said pressure chamber and provided with a longitudinal extension adapted to abut said cover when said valve spool is in one position thereof.

11. A device as defined in claim 10; and further comprising another spring in said pressure chamber and bearing upon said cover and said second land, said other spring being weaker than the first-mentioned spring.

* * * * *